US009954978B2

(12) United States Patent
Men et al.

(10) Patent No.: US 9,954,978 B2
(45) Date of Patent: Apr. 24, 2018

(54) INTERNET OF THINGS, COMMUNICATION METHOD, BRIDGE DEVICE AND ACCESS DEVICE FOR INTERNET OF THINGS

(71) Applicant: Vango Technologies, Inc., Hangzhou, Zhejiang (CN)

(72) Inventors: Changyou Men, Zhejiang (CN); Nick Nianxiong Tan, Zhejiang (CN)

(73) Assignee: VANGO TECHNOLOGIES, INC., Hangzhou, Zhejiang (CN)

( * ) Notice: Subject to any disclaimer, the term of this patent is extended or adjusted under 35 U.S.C. 154(b) by 286 days.

(21) Appl. No.: 14/807,841

(22) Filed: Jul. 23, 2015

(65) Prior Publication Data

US 2016/0150057 A1 May 26, 2016

(30) Foreign Application Priority Data

Nov. 20, 2014 (CN) .......................... 2014 1 0667291

(51) Int. Cl.
*G06F 15/16* (2006.01)
*H04L 29/06* (2006.01)
(Continued)

(52) U.S. Cl.
CPC ............. *H04L 69/08* (2013.01); *H04W 4/005* (2013.01); *H04L 12/2836* (2013.01)

(58) Field of Classification Search
CPC ................................ H04L 69/18; H04L 12/28
See application file for complete search history.

(56) References Cited

U.S. PATENT DOCUMENTS

2014/0085059 A1 3/2014 Chen et al.
2014/0180447 A1 6/2014 Chen et al.

FOREIGN PATENT DOCUMENTS

CN 101826979 * 9/2010
CN 101826979 A 9/2010
(Continued)

OTHER PUBLICATIONS

Jung et al; A Transparent IPv6 Multi-Protocol Gateway to Integrate Building Automation Systems in the Internet of Things; 2012; IEEE Conference on Green Computing and Communications / Conference on Internet of Things; pp. 225-233.*
(Continued)

*Primary Examiner* — Glenford Madamba
(74) *Attorney, Agent, or Firm* — U.S. Fairsky LLP; Yue Xu

(57) ABSTRACT

An Internet of Things (IOT), a communication method, a bridge device and an access device for the IOT are disclosed. The method is applied to the bridge device for the IOT, and includes: receiving, by the bridge device, data information carrying a specified identification sent from an IOT access device; searching for, by the bridge device, a power consumption device in the IOT corresponding to the specified identification; determining, by the bridge device, whether the power consumption device and the IOT access device support the same communication mode and communication protocol; converting, by the bridge device, the data information into data information which is identifiable to the power consumption device, in the case that it is determined that the power consumption device and the IOT access device support different communication modes and communication protocols; and sending, by the bridge device, the converted data information to the power consumption device.

12 Claims, 3 Drawing Sheets

(51) Int. Cl.
*H04W 4/00* (2018.01)
*H04L 12/28* (2006.01)

(56) References Cited

FOREIGN PATENT DOCUMENTS

| CN | 102882751 A | 1/2013 |
| CN | 102957596 A | 3/2013 |
| CN | 202906945 U | 4/2013 |
| WO | WO2015/049259 A1 * | 9/2015 |

OTHER PUBLICATIONS

Summary of the Chinese 1st Office Action for CN201410667291.X, dated May 11, 2017.

* cited by examiner

INTERNET OF THINGS, COMMUNICATION METHOD, BRIDGE DEVICE AND ACCESS DEVICE FOR INTERNET OF THINGS

CROSS-REFERENCE TO RELATED APPLICATIONS

The present application claims the priority to Chinese Patent Application No. 201410667291.X, entitled as "INTERNET OF THINGS, COMMUNICATION METHOD, BRIDGE DEVICE AND ACCESS DEVICE FOR INTERNET OF THINGS", and filed with the Chinese Patent Office on Nov. 20, 2014, the contents of which are incorporated herein by reference in its entirety.

FIELD

The disclosure relates to the field of Internet of Things in Power Systems (IOTIPS), and in particular to an Internet of Things (IOT), and a communication method, a bridge device and an access device for the IOT.

BACKGROUND

With the fast development of IOT, IOT application such as smart home has attracted more and more attention. The concept of the smart home is as follows: all the home devices (for example an electric-drive curtain, an air conditioner, a television, a garage gate or a refrigerator) are reconstructed intelligently, a sensing unit, a communication unit and an execution unit are added and connected together via a home local area network; the network may be a private network or the Internet accessed via a home gateway router, thereby implementing remote monitoring and control.

However, different home devices support different communication protocols, for example a near distance infrared communication protocol, a Bluetooth protocol or a Wi-Fi protocol related to the field of wireless communication, and a fiber optic network protocol, an Ethernet protocol or a power line carrier communication protocol related to the field of wired communication, hence the original communication modes and communication protocols of the home device have to be changed before the home device is accessed to the IOT, while the high cost for the intelligentization reconstruction of the home device limits the popularity of the home intelligence to a great extent.

SUMMARY

In view of the above, an Internet of Things (IOT), a communication method, a bridge device and an access device for the IOT are provided by the disclosure, such that a home device is accessed to the IOT while a cost for intelligentization reconstruction of the home device is saved.

A communication method for an Internet of Things (IOT) is provided, which is applied to a bridge device for the IOT, and the communication method includes:

receiving, by the bridge device, data information carrying a specified identification sent from an IOT access device;

searching for, by the bridge device, a power consumption device in the IOT corresponding to the specified identification;

determining, by the bridge device, whether the power consumption device and the IOT access device support the same communication mode and communication protocol;

converting, by the bridge device, the data information into data information which is identifiable to the power consumption device, in the case that it is determined that the power consumption device and the IOT access device support different communication modes and communication protocols; and sending, by the bridge device, the converted data information to the power consumption device.

Optionally, after the determining whether the power consumption device and the IOT access device support the same communication mode and communication protocol, the method may further include:

transmitting the data information sent from the IOT access device to the power consumption directly, in the case that it is determined that the power consumption device and the IOT access device support the same communication mode and communication protocol.

Optionally, the specified identification may be an IP address.

A bridge device for an Internet of Things (IOT) includes a receiving unit, a searching unit, a determining unit, a converting unit, and a first sending unit.

The receiving unit is configured to receive data information carrying a specified identification sent from an IOT access device.

The searching unit is configured to search for a power consumption device in the IOT corresponding to the specified identification.

The determining unit is configured to determine whether the power consumption device and the IOT access device support the same communication mode and communication protocol.

The converting unit is configured to convert the data information into data information which is identifiable to the power consumption device, in the case that it is determined that the power consumption device and the IOT access device support different communication modes and communication protocols.

The first sending unit is configured to send the converted data information to the power consumption device.

Optionally, the bridge device may further include a second sending unit.

The second sending unit is configured to transmit the data information sent from the IOT access device to the power consumption device directly, in the case that it is determined that the power consumption device and the IOT access device support the same communication mode and communication protocol.

Optionally, the receiving unit may be configured to receive data information carrying an IP address sent from the IOT access device, and the searching unit may be configured to search for a power consumption device in the IOT corresponding to the IP address.

An Internet of Things (IOT) access device is provided, which includes a body of the IOT access device and a bridge module connected to the body.

The bridge module is configured to receive data information carrying a specified identification sent from the body of the IOT access device; search for a power consumption device in the IOT corresponding to the specified identification; determine whether the body of the IOT access device and the power consumption device support the same communication mode and communication protocol; convert the data information into data information which is identifiable to the power consumption device, in the case that it is determined that the body of the IOT access device and the power consumption device support different communication modes and communication protocols; and send the converted data information to the power consumption device.

Optionally, after determining whether the power consumption device and the body of the IOT access device support the same communication mode and communication protocol, the bridge module may be further configured to transmit the data information sent from the body of the IOT access device to the power consumption device directly, in the case that it is determined that the power consumption device and the body of the IOT access device support the same communication mode and communication protocol.

An Internet of Things (IOT) is provided, which includes an IOT access device, a power consumption device and a bridge device for connecting the IOT access device and the power consumption device.

The bridge device is configured to receive data information carrying a specified identification sent from the IOT access device; search for a power consumption device in the IOT corresponding to the specified identification; determine whether the power consumption device and the IOT access device support the same communication mode and communication protocol; convert the data information into data information which is identifiable to the power consumption device, in the case that it is determined that the power consumption device and the IOT access device support different communication modes and communication protocols; and send the converted data information to the power consumption device.

Optionally, after determining whether the power consumption device and the IOT access device support the same communication mode and communication protocol, the bridge device may be further configured to transmit the data information sent from the IOT access device to the power consumption device directly, in the case that it is determined that the power consumption device and the IOT access device support the same communication mode and communication protocol.

According to the above technical solutions, in the disclosure, an unique specified identification is allocated to a power consumption device to be accessed to the IOT in advance; in the case that the IOT access device needs to communicate with a power consumption device supporting other communication modes and communication protocols, the data information sent from the IOT access device is converted into data information which is identifiable to the power consumption device, and then the converted data information is sent to the power consumption device, thereby establishing communication between two terminals supporting different communication modes and communication protocols. As compared with the conventional technology, power consumption devices supporting different communication modes and communication protocols can be accessed to the IOT without changing the original communication modes and communication protocols of the power consumption devices, hence the cost for intelligentization is very low. In addition, in the disclosure, the bridge device also achieves the function of a repeater, thereby increasing a distance of the signal transmission.

BRIEF DESCRIPTION OF THE DRAWINGS

In order to illustrate the technical solutions in the embodiments of the invention or the conventional technology more clearly, hereinafter the drawings for the description of the embodiments or the conventional technology will be introduced simply. Apparently, the drawings described below illustrate only embodiments of the invention, and other drawings may be obtained based on the provided drawings by those skilled in the art without any creative work.

DETAILED DESCRIPTION

The technical solutions in the embodiments of the invention will be described clearly and completely in conjunction with the drawings of the embodiments of the invention hereinafter. Apparently, the described embodiments are only some of the embodiments of the invention, but not all the embodiments. Any other embodiments obtained based on the embodiments of the invention by those skilled in the art without any creative work fall within the scope of protection of the disclosure.

Figure 1:
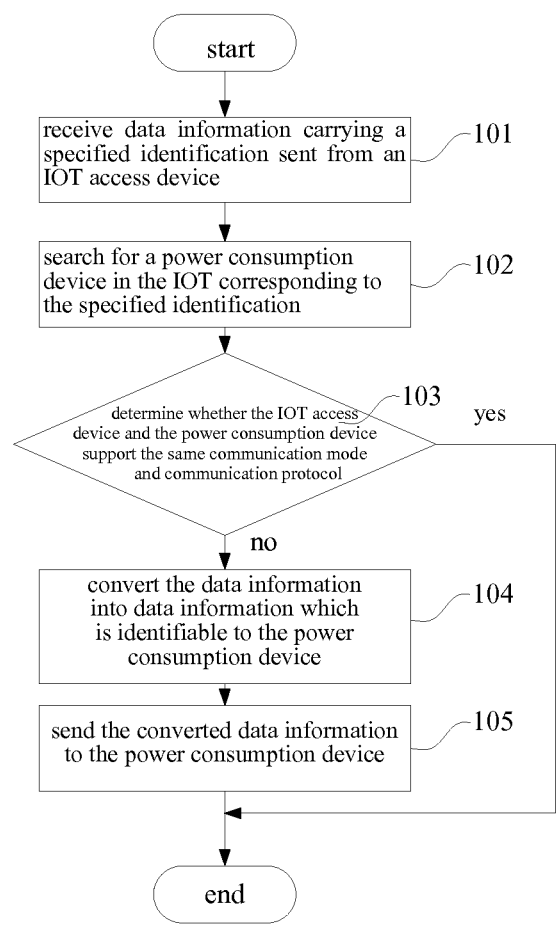
FIG. 1 is a flowchart of a communication method for an Internet of Things (IOT) disclosed by an embodiment of the invention.

Referring to FIG. 1, a communication method for an Internet of Things (IOT) is disclosed by an embodiment of the invention, which is applied to a bridge device for the IOT, such that a home device is accessed to the IOT while a cost for intelligentization reconstruction of the home device is saved. The method includes step 101 to step 105.

In step 101, the bridge device receives data information carrying a specified identification sent from an IOT access device.

In step 102, the bridge device searches for a power consumption device in the IOT corresponding to the specified identification, where for each power device, the specified identification may be a unique IP address allocated to the power device in the IOT in advance.

In step 103, the bridge device determines whether the power consumption device and the IOT access device support the same communication mode and communication protocol; and in the case that it is determined that the power consumption device and the IOT access device support different communication modes and communication protocols, the method proceeds to step 104; and otherwise, the procedure ends.

In step 104, the bridge device converts the data information into data information which is identifiable to the power consumption device.

In step 105, the bridge device sends the converted data information to the power consumption device.

In the embodiment, a unique specified identification is allocated to a power consumption device to be accessed to the IOT in advance. In the case that the IOT access device needs to communicate with a power consumption device supporting other communication modes and communication protocols, the data information sent from the IOT access device is converted into data information which is identifiable to the power consumption device, and then the converted data information is sent to the power consumption device, thereby establishing communication between two terminals supporting different communication modes and communication protocols. As compared with the conventional technology, in the embodiment, power consumption devices supporting different communication modes and communication protocols can be accessed to the IOT without changing the original communication modes and communication protocols of the power consumption device, hence the cost for intelligentization is very low.

In addition, due to the influence from a noise of a transmission line, a digital signal or an analog signal carrying the data information can only be transmitted for a limited distance; however, in the embodiment, the received signal can be converted and sent, and a relay function is realized, hence increasing a distance of the signal transmission.

The IOT access device and the power consumption device may be a terminal supporting any communication mode and communication protocol, for example an infrared communication protocol, a Bluetooth protocol, a radio frequency communication protocol or a Wi-Fi protocol related to the field of wireless communication, and a fiber optic network communication protocol, an Ethernet communication protocol or power line carrier communication protocol related to the field of wired communication. In the technical solutions of the embodiment, the bridge device functioning as a "bridge" is provided between the IOT access device and the power consumption device, and a power consumption device supporting any communication mode and communication protocol can be accessed to a home local area private network or the Internet via the bridge device, thereby being beneficial for the popularity of the home intelligentization and increasing a distance of the signal transmission.

In addition, it should be noted that the power consumption device is not limited to the home device, i.e., the communication method for the IOT may also be applied to an intelligence system for example an intelligent grid, an intelligent logistics or an intelligent city, beyond applying to the smart home; an application range of the communication method is wide and a program portability of the communication method is strong. The IOT access device may be a mobile phone, a computer or other remote monitoring devices.

In order to describe the technical solutions of the embodiment more clearly, hereinafter it is illustrated by taking the smart home as an example.

Among the home devices, it is assumed that an electric-drive curtain supports a radio frequency communication protocol, a television supports an infrared communication protocol, and neither of the electric curtain and the television can establish communication with an IOT gateway supporting a power line carrier communication protocol. In order to solve the problem above, in the embodiment, a bridge device is provided between the electric curtain, the television and the gateway. A working principle of the bridge device is as follows: converting data information supporting the infrared communication protocol into data information supporting the power line carrier communication protocol and outputting the converted data information, in the case that the data information carrying an IP address of the television is received, thereby controlling the communication with the television; or converting data information supporting the radio frequency communication protocol into data information supporting the power line carrier communication protocol and outputting the converted data information, in the case that the data information carrying an IP address of the electric-drive curtain is received, thereby controlling the communication with the electric-drive curtain.

Figure 2:
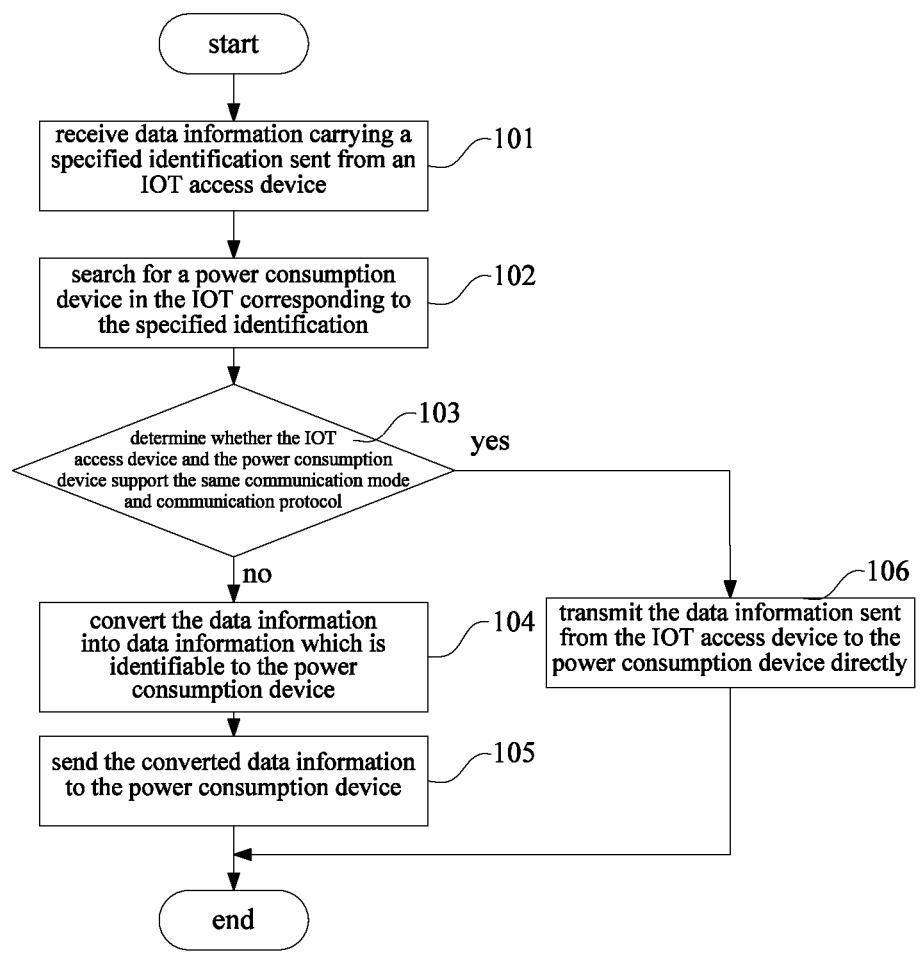
FIG. 2 is a flowchart of another communication method for an IOT disclosed by an embodiment of the invention.

Preferably, another communication method for an IOT is further disclosed by an embodiment of the invention. Referring to FIG. 2, the method includes step 101 to step 106.

In step 101, a bridge device receives data information carrying a specified identification sent from an IOT access device.

In step 102, the bridge device searches for a power consumption device in the IOT corresponding to the specified identification, where for each power consumption device, the specified identification may be a unique IP address allocated to the power consumption device in advance.

In step 103, the bridge device determines whether the power consumption device and the IOT access device support the same communication mode and communication protocol; the method proceeds to step 104, in the case that it is determined that the power consumption device and the IOT access device support different communication modes and communication protocols; and otherwise, the method proceeds to step 106.

In step 104, the bridge device converts the data information into data information which is identifiable to the power consumption device.

In step 105, the bridge device sends the converted data information to the power consumption device.

In step 106, the bridge device transmits the data information sent from the IOT access device to the power consumption device directly.

As compared with the previous embodiment, in the embodiment, the method further includes: after it is determined whether the power consumption device and the IOT access device support the same communication mode and communication protocol, transmitting the data information sent from the IOT access device to the power consumption device, in the case that it is determined that the power consumption device and the IOT access device support the same communication mode and communication protocol. For two communication terminals which support the same communication mode and communication protocol and has data information distortion and receive error due to a long distance between the two communication terminals, the bridge device based on the technical solution further provides the function of a repeater, thereby increasing a distance of the signal transmission and reducing the number of network failures.

Figure 3:
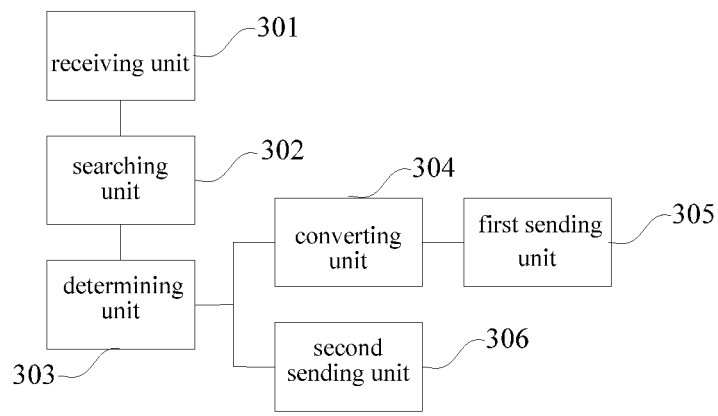
FIG. 3 is a schematic structural diagram of a bridge device for an IOT disclosed by an embodiment of the invention.

Referring to FIG. 3, a bridge device for an IOT is disclosed by an embodiment of the invention, which includes a receiving unit 301, a searching unit 302, a determining unit 303, a converting unit 304 and a first sending unit 305.

The receiving unit 301 is configured to receive data information carrying a specified identification sent from an IOT access device.

The searching unit 302 is configured to search for a power consumption device in the IOT corresponding to the specified identification.

The determining unit 303 is configured to determine whether the power consumption device and the IOT access device support the same communication mode and communication protocol.

The converting unit 304 is configured to convert the data information into data information which is identifiable to the power consumption device, in the case that it is determined that the power consumption device and the IOT access device support different communication modes and communication protocols.

The first sending unit 305 is configured to send the converted data information to the power consumption device.

Preferably, still referring to FIG. 3, the bridge device for the IOT further includes a second sending unit 306, which is configured to transmit the data information sent from the IOT access device to the power consumption device directly, in the case that it is determined that the power consumption device and the IOT access device support the same communication mode and communication protocol.

Specifically, the receiving unit 301 is configured to receive data information carrying an IP address sent from the IOT access device, and the searching unit 302 is configured to search for a power consumption device corresponding to the IP address.

An IOT access device is further disclosed by an embodiment of the invention, which includes a body of the IOT access device and a bridge module connected to the body. The bridge module is configured to receive data information carrying a specified identification sent from the body of the IOT access device; search for a power consumption device in the IOT corresponding to the specified identification; determine whether the body of the IOT access device and the power consumption device support the same communication mode and communication protocol; convert the data information into data information which is identifiable to the power consumption device, in the case that it is determined that the body of the IOT access device and the power consumption device support different communication modes and communication protocols; and send the converted data information to the power consumption device.

Preferably, after determining whether the power consumption device and the body of the IOT access device support the same communication mode and communication protocol, the bridge module is further configured to transmit the data information sent from the body of the IOT access device to the power consumption device directly, in the case that it is determined that the power consumption device and the body of the IOT access device support the same communication mode and communication protocol.

Figure 4:
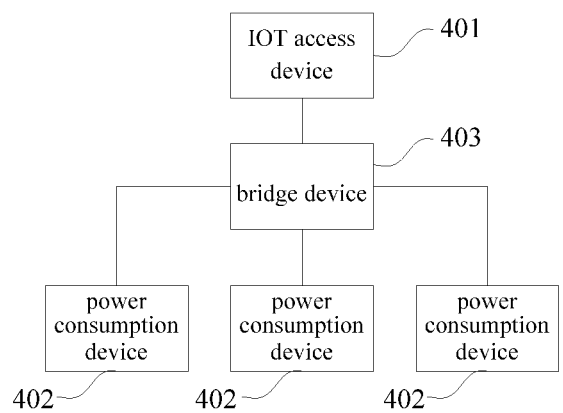
FIG. 4 is a schematic structural diagram of an IOT disclosed by an embodiment of the invention.

Referring to FIG. 4, an IOT is further disclosed by an embodiment of the invention, which includes an IOT access device 401, a power consumption device 402 and a bridge device 403 for connecting the IOT access device 401 and the power consumption device 402.

The bridge device 403 is configured to receive data information carrying a specified identification sent from the IOT access device 401; search for a power consumption device 402 in the IOT corresponding to the specified identification; determine whether the power consumption device 402 and the IOT access device 401 support the same communication mode and communication protocol; convert the data information into data information which is identifiable to the power consumption device 402, in the case that it is determined that the power consumption device 402 and the IOT access device 401 support different communication modes and communication protocols; and send the converted data information to the power consumption device 402.

It should be noted that, in the IOT, the number of the bridge devices 403, the number of the IOT access devices 401 and the number of the power consumption devices 402 are not restricted, and whether a connection way for the bridge device 403, the IOT access device 401 and the power consumption device 402 is wireless/wired is not restricted either. In FIG. 4, the IOT includes one IOT access device 401, one bridge device 403 and three power consumption devices 402, and the IOT access device 401, the bridge device 403 and the power consumption devices 402 are connected in a wired way, for example.

Preferably, after determining whether the power consumption device 402 and the IOT access device 401 support the same communication mode and communication protocol, the bridge device 403 is configured to transmit the data information sent from the IOT access device 401 to the power consumption device 402 directly, in the case that it is determined that the power consumption device 402 and the IOT access device 401 support the same communication mode and communication protocol.

For a functional module via which the home device is accessed to the IOT while a cost for intelligentization reconstruction of the home device is saved, the functional module may be an independent device or be integrated within the IOT access device, which is not defined.

In summary, in the disclosure, an unique specified identification is allocated to a power consumption device to be accessed to the IOT in advance; in the case that the IOT access device needs to communicate with a power consumption device supporting other communication modes and communication protocols, the data information sent from the IOT access device is converted into data information which is identifiable to the power consumption device, and then the converted data information is sent to the power consumption device, thereby establishing communication between two terminals supporting different communication modes and communication protocols. As compared with the conventional technology, power consumption devices supporting different communication modes and communication protocols can be accessed to the IOT without changing the original communication modes and communication protocols of the power consumption devices, hence the cost for intelligentization is very low. In addition, in the disclosure, the bridge device also achieves the function of a repeater, thereby increasing a distance of the signal transmission.

Various embodiments of the specification are described in a progressive way, each embodiment lays emphasis on its difference from other embodiments, and for the same or similar parts between various embodiments, one may refer to the description of other embodiments. For the device and the IOT disclosed by the embodiments, since they correspond to the method disclosed by the embodiments, the description is simple, and for the related parts one may refer to the description of the method embodiments.

The above description of the disclosed embodiments enables those skilled in the art to implement or practice the disclosure. Various changes to these embodiments are apparent for those skilled in the art, and the general principles defined herein may be implemented in other embodiments without departing from the spirit or scope of the disclosure. Hence, the disclosure is not limited to these embodiments disclosed herein, but claims a widest scope consistent with the principles and novel features disclosed herein.

The invention claimed is:

1. A communication method for an Internet of Things, IOT, applied to a bridge device for the IOT, the communication method comprising:
   receiving, by the bridge device, data information carrying a specified identification for identifying a power consumption device sent from an IOT access device, wherein the IOT access device and the power consumption device are not a same device;
   searching for, by the bridge device, the power consumption device in the IOT corresponding to the specified identification;

determining, by the bridge device, whether the power consumption device and the IOT access device support the same communication mode and communication protocol;

converting, by the bridge device, the data information into data information which is identifiable to the power consumption device, in the case that it is determined that the power consumption device and the IOT access device support different communication modes and communication protocols; and sending, by the bridge device, the converted data information to the power consumption device.

2. The method according to claim 1, further comprising: after the determining whether the power consumption device and the IOT access device support the same communication mode and communication protocol, transmitting the data information sent from the IOT access device to the power consumption device directly, in the case that it is determined that the power consumption device and the IOT access device support the same communication mode and communication protocol.

3. The method according claim 1, wherein the specified identification is an IP address.

4. The method according claim 2, wherein the specified identification is an IP address.

5. A bridge device for an Internet of Things (IOT), comprising:

a receiving unit, configured to receive data information carrying a specified identification for identifying a power consumption device sent from an IOT access device, wherein the IOT access device and the power consumption device are not a same device;

a searching unit, configured to search for the power consumption device in the IOT corresponding to the specified identification;

a determining unit, configured to determine whether the power consumption device and the IOT access device support the same communication mode and communication protocol;

a converting unit, configured to convert the data information into data information which is identifiable to the power consumption device, in the case that it is determined that the power consumption device and the IOT access device support different communication modes and communication protocols; and a first sending unit, configured to send the converted data information to the power consumption device.

6. The device according to claim 5, further comprising:

a second sending unit, configured to transmit the data information sent from the IOT access device to the power consumption device directly, in the case that it is determined that the power consumption device and the IOT access device support the same communication mode and communication protocol.

7. The device according to claim 4, wherein the receiving unit is configured to receive data information carrying an IP address sent from the IOT access device, and the searching unit is configured to search for a power consumption device in the IOT corresponding to the IP address.

8. The device according to claim 5, wherein the receiving unit is configured to receive data information carrying an IP address sent from the IOT access device, and the searching unit is configured to search for a power consumption device in the IOT corresponding to the IP address.

9. An Internet of Things (IOT) access device, comprising a body of the IOT access device and a bridge module connected to the body; wherein the bridge module is configured to receive data information carrying a specified identification for identifying a power consumption device sent from the body of the IOT access device, wherein the IOT access device and the power consumption device are not a same device; search for the power consumption device in the IOT corresponding to the specified identification; determine whether the body of the IOT access device and the power consumption device support the same communication mode and communication protocol; convert the data information into data information which is identifiable to the power consumption device, in the case that it is determined that the body of the IOT access device and the power consumption device support different communication modes and communication protocols; and send the converted data information to the power consumption device.

10. The IOT access device according to claim 9, wherein after determining whether the power consumption device and the body of the IOT access device support the same communication mode and communication protocol, the bridge module is further configured to transmit the data information sent from the body of the IOT access device to the power consumption device directly, in the case that it is determined that the power consumption device and the body of the IOT access device support the same communication mode and communication protocol.

11. An Internet of Things, IOT, comprising an IOT access device, a power consumption device and a bridge device for connecting the IOT access device and the power consumption device; wherein the bridge device is configured to receive data information carrying a specified identification for identifying a power consumption device sent from the IOT access device, wherein the IOT access device and the power consumption device are not a same device; search for the power consumption device in the IOT corresponding to the specified identification; determine whether the power consumption device and the IOT access device support the same communication mode and communication protocol; convert the data information into data information which is identifiable to the power consumption device, in the case that it is determined that the power consumption device and the IOT access device support different communication modes and communication protocols; and send the converted data information to the power consumption device.

12. The IOT according to claim 11, wherein after determining whether the power consumption device and the IOT access device support the same communication mode and communication protocol, the bridge device is further configured to transmit the data information sent from the IOT access device to the power consumption device directly, in the case that it is determined that the power consumption device and the IOT access device support the same communication mode and communication protocol.

* * * * *